No. 735,971. PATENTED AUG. 11, 1903.
H. HALSEY.
ELECTRIC BATTERY.
APPLICATION FILED APR. 18, 1902. RENEWED JAN. 8, 1903.
NO MODEL.
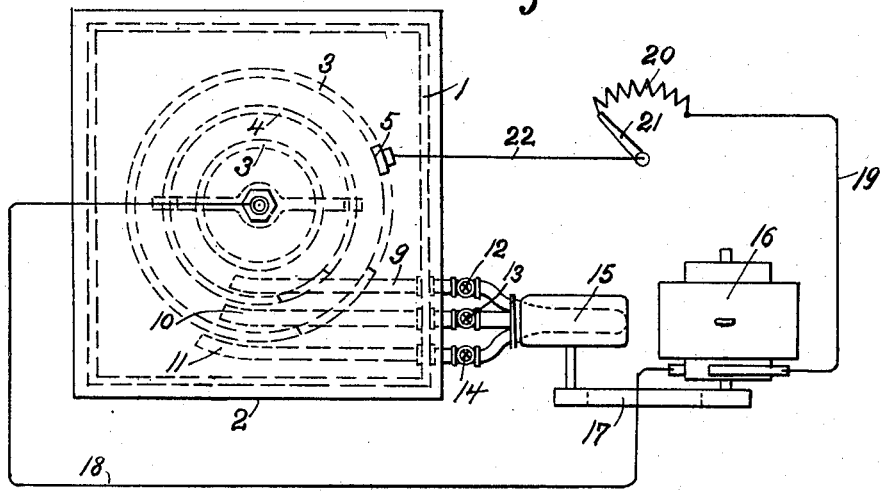
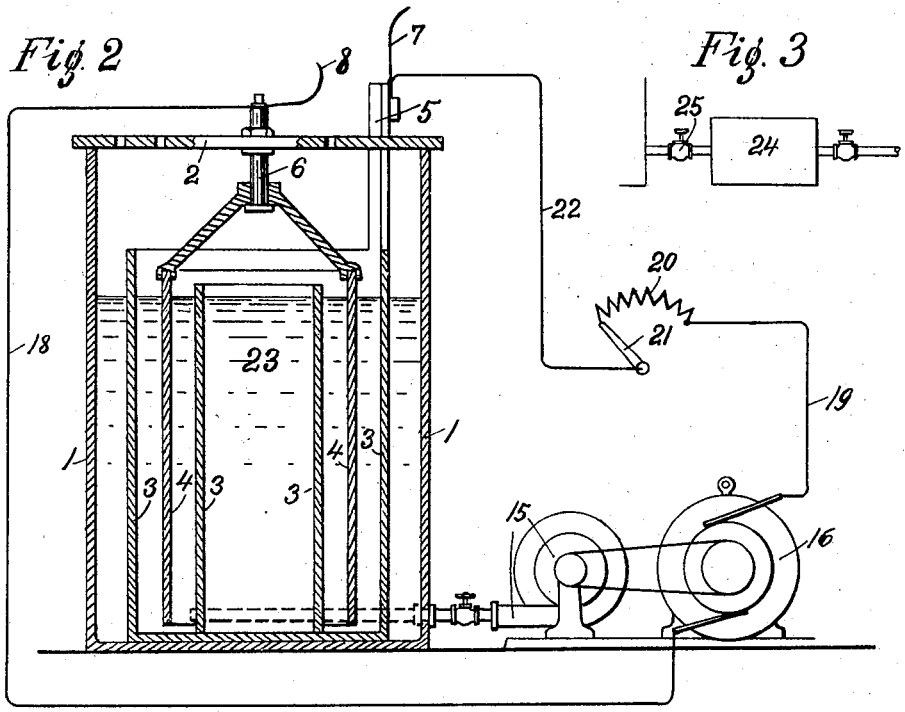
WITNESSES:
Robert H. Ireland
Lester C. Taylor
INVENTOR
Henry Halsey
BY
C. W. Edwards
ATTORNEY.

No. 735,971.

Patented August 11, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 735,971, dated August 11, 1903.

Application filed April 18, 1902. Renewed January 8, 1903. Serial No. 138,317. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries, and has particular reference to that class of batteries wherein movement is maintained between the elements and the electrolyte.

The object of the invention is to provide improved means for maintaining the movement of the electrolyte.

A further object is to construct a battery which shall be simple in construction and the parts of which may be readily assembled or dismantled.

The invention will be more particularly described with reference to the form thereof shown in the accompanying drawings, in which—

Figure 1 is a top view of a battery embodying my invention. Fig. 2 is a sectional view of the same, and Fig. 3 is a detailed view showing a modified arrangement in which the storage-reservoir is employed in lieu of a pump.

Referring more particularly to the drawings, 1 represents the case of the battery, and 2 the cover therefor.

3 and 4 represent the elements. In the present instance the elements 3 rest upon the bottom of the casing, and a contact-strip 5 projects therefrom through the top of the cover. Element 4 is suspended from the cover 2 by the conducting-plug 6. The elements are circular in form, and therefore may be fitted one within the other, as indicated in the drawings, thus affording a maximum element surface in a given space.

The conductors 7 and 8 of the external circuit are connected with the respective elements by the contacting strips 5 and 6. One or more tubes 9, 10, and 11 lead from the outside of the battery into the respective spaces between the elements. Preferably the tubes enter the spaces between the elements at or near the bottom of the cell, and where the spaces are angular, as shown in the drawings, the tubes should enter the spaces tangentially. Each of the tubes is controlled by the regulating-valve 12, 13, or 14, and all of the tubes are connected with a suitable air-blower 15 or other source of fluid-pressure. Air-blower 15 is driven by any suitable motor, such as the electric motor 16, belted to the air-blower by a belt 17. A conductor 18 leads from the block 6 to motor 16, and from motor 16 a wire 19 leads to the resistance 20. Controller-arm 21, connected by wire 22 with the contacting strip 5, is adapted to make contact with the resistance 20.

In the operation of the battery the electrolyte 23 is poured into the case and the elements arranged in position. Upon closing the motor-circuit through controller-arm 21 the motor 16 is started and run at a predetermined speed. This causes the blower 15 to force air through the tubes 9, 10, and 11 into the annular spaces between the elements. The forcing of the air against the electrolyte causes the latter to flow around the elements in the channel between the same, thus brushing the elements with the electrolyte, and thus preventing polarization. The constant upward flow of the air through the electrolyte will also aid to some extent in preventing polarization.

The pressure of the air and the rate at which the electrolyte is moved may be regulated by varying the speed of the motor 16 through the resistance 20 or by means of the valves 12, 13, and 14.

It will be understood, of course, that the number of tubes and their location will vary according to the circumstances.

In lieu of providing the blower and the motor a storage-tank 24 may be provided, as shown in Fig. 3, the passage of the air from the storage-tank into the tubes being regulated by valve 25. The tank may be charged in any suitable manner.

It will be understood, of course, that the construction above described may be modified in various respects without departing from the spirit of the invention, and I therefore do not limit myself to the specific construction shown herein. For example, although I have herein described the apparatus as employing "air-pressure," any other suitable fluid medium may be employed.

Having thus described my invention, I declare that what I claim as new, and desire to secure by Letters Patent, is—

1. In a battery, the combination with the electrolyte, of elements so arranged as to provide a continuous passage which includes the space between the elements, and means for applying fluid-pressure to the electrolyte to create a continuous flow of the same in said passage, substantially as described.

2. In a battery, the combination of a plurality of concentrically-arranged elements, an electrolyte between the same, and means for applying fluid-pressure to the electrolyte to move the same between the elements, substantially as described.

3. In a battery, the combination of a plurality of concentrically-arranged elements, an electrolyte between the same, and means for applying fluid-pressure to the electrolyte in a direction tangentially to the channel formed between the elements, substantially as described.

4. In a battery, the combination of a plurality of concentrically-arranged elements, an electrolyte between the same, and means for applying fluid-pressure to the electrolyte to move the same between the elements in a direction tangentially to the same, substantially as described.

5. In a battery, the combination of a plurality of concentrically-arranged elements, an electrolyte between the same, and means for applying pressure to the electrolyte to move the same between the elements in a direction tangentially to the same, said means being located at or near the bottom of the cell, substantially as described.

6. In a battery, the combination with the electrolyte, of elements separated from each other to provide a passage between the same, means for permitting a horizontal flow of the electrolyte through said passage, and means for creating fluid-pressure upon the electrolyte in a direction to cause the same to flow horizontally through said passage, substantially as described.

7. In a battery, the combination of a plurality of concentrically-arranged elements, an electrolyte between the same, and means for applying fluid-pressure to the electrolyte to cause the same to flow horizontally in the channel formed between the elements, substantially as described.

8. In a battery, the combination of a plurality of concentrically-arranged elements, an electrolyte between the same, means for applying pressure to the electrolyte to move the same between the elements in a direction tangentially to the same, and means for varying the said pressure, substantially as described.

9. In a battery, the combination with the electrolyte, of elements separated from each other to provide a passage between the same, means for permitting a horizontal flow of the electrolyte through said passage, means for creating fluid-pressure upon the electrolyte in a direction to cause the same to flow horizontally through said passage, and means for varying the said fluid-pressure, substantially as described.

In testimony whereof I affix my signature in presence of two witnesses.

HENRY HALSEY.

Witnesses:
HENRY BEST,
C. O. EDWARDS.